United States Patent
Mi et al.

(10) Patent No.: US 12,481,188 B2
(45) Date of Patent: Nov. 25, 2025

(54) VARIABLE DIFFUSER PATTERN FOR IMPROVING COLOR AND LUMINOSITY UNIFORMITY

(71) Applicant: CORNING INCORPORATED, Corning, NY (US)

(72) Inventors: Xiang-Dong Mi, Pittsford, NY (US); Horst Herbert Anton Schreiber, Livonia, NY (US); Richard Lynton Wiggins, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/701,448

(22) PCT Filed: Nov. 8, 2022

(86) PCT No.: PCT/US2022/049191
§ 371 (c)(1),
(2) Date: Apr. 15, 2024

(87) PCT Pub. No.: WO2023/091327
PCT Pub. Date: May 25, 2023

(65) Prior Publication Data
US 2024/0402533 A1    Dec. 5, 2024

Related U.S. Application Data

(60) Provisional application No. 63/281,876, filed on Nov. 22, 2021.

(51) Int. Cl.
*G02F 1/13357* (2006.01)
*G02F 1/1335* (2006.01)

(52) U.S. Cl.
CPC .. *G02F 1/133606* (2013.01); *G02F 1/133603* (2013.01); *G02F 1/133605* (2013.01);
(Continued)

(58) Field of Classification Search
CPC ......... G02F 1/133606; G02F 1/133603; G02F 1/133605; G02F 1/133611; G02F 1/133614; G02F 2203/03; G02F 1/133609
See application file for complete search history.

(56) References Cited

U.S. PATENT DOCUMENTS

| 11,001,755 B2 * | 5/2021 | Harada .............. C09K 11/7728 |
| 2019/0129251 A1 | 5/2019 | Watanabe et al. |

(Continued)

FOREIGN PATENT DOCUMENTS

| WO | 2020/101517 A1 | 5/2020 |
| WO | 2021/071378 A1 | 4/2021 |
| WO | 2021/128605 A1 | 7/2021 |

OTHER PUBLICATIONS

Yang, WO 2021128605 A1, machine translation 2021 (Year: 2021).*

(Continued)

*Primary Examiner* — Tracie Y Green
(74) *Attorney, Agent, or Firm* — F Brock Riggs; Kevin M. Able

(57) ABSTRACT

Methods, systems, devices, and apparatuses are described. A variable diffuser pattern (VDP) may be applied to a substrate and configured to diffuse light from a light source (e.g., a light emitting diode (LED)), where the diffused light may have luminance uniformity and color uniformity measured at various distances from the light source. The VDP may include two or more different materials (e.g., different nanoparticle inks), and each material may have unique spectral reflectance and transmittance properties. For example, a first material may produce relatively more backscatter in red light wavelengths (e.g., as compared to blue and green light wavelengths), and a second material may produce relatively increased backscatter in blue light wavelengths (e.g., as compared to red and green light wavelengths). The VDP including the first and the second material may provide (Continued)

controlled scattering of light from the light source, resulting in uniform luminance and color of the scattered light.

19 Claims, 7 Drawing Sheets

(52) U.S. Cl.
CPC .. *G02F 1/133611* (2013.01); *G02F 1/133614* (2021.01); *G02F 2203/03* (2013.01)

(56) References Cited

U.S. PATENT DOCUMENTS

| | | | |
|---|---|---|---|
| 2020/0096820 A1 | 3/2020 | Yasunaga et al. | |
| 2021/0157204 A1 | 5/2021 | Park et al. | |
| 2021/0397049 A1* | 12/2021 | Allen | G02F 1/133524 |
| 2023/0142417 A1* | 5/2023 | Allen | G02F 1/133602 |
| | | | 362/97.1 |

OTHER PUBLICATIONS

International Search Report and Written Opinion of the International Searching Authority; PCT/US2022/049191; dated Feb. 21, 2023; 23 pages; European Patent Office.

* cited by examiner

VARIABLE DIFFUSER PATTERN FOR IMPROVING COLOR AND LUMINOSITY UNIFORMITY

CROSS REFERENCE TO RELATED APPLICATIONS

This is a national stage application under 35 U.S.C. § 371 of International Application No. PCT/US2022/049191, filed on Nov. 8, 2022, which claims the benefit of priority under 35 U.S.C. § 119 of U.S. Provisional Application Ser. No. 63/281,876 filed on Nov. 21, 2021, which is incorporated herein by reference in their entireties.

FIELD OF TECHNOLOGY

The present disclosure relates generally to direct-lit backlights, and more specifically to a variable diffuser pattern (VDP) for improving color and luminosity uniformity.

BACKGROUND

Liquid crystal displays (LCDs) have various applications in a range of personal and industrial electronics, such as portable devices (e.g., smart phones, laptops), computer monitors, instrument panels (e.g., in a vehicle), televisions, and digital cameras, among other examples. LCDs may provide an optical interface for displaying an image by passing light (e.g., unpolarized light) through a liquid crystal layer of respective pixels, where various backlighting techniques may be used to provide the light to the pixels of the LCD. As an example, an LCD may use edge lighting techniques in which multiple light emitting diodes (LEDs) may be located around a perimeter of the display. In such an example, light from the LEDs may be spread over a display panel using, for example, a waveguide, a lightguide, a diffuser, or other components. Alternatively, direct-lit LCDs may include an array (e.g., a two-dimensional array) of LEDs behind the display panel, where diffused light from the LEDs provides lighting to the liquid crystal layer of the pixels. Various backlighting techniques may have various tradeoffs in performance and form factor. For example, edge-lit LCDs may be thinner than direct-lit LCDs, but may lack some control in two-dimensional local dimming (e.g., as compared to direct-lit LCDs). Likewise, direct-lit LCDs may provide improved luminance and local dimming control (e.g., as compared to edge-lit LCDs) at the cost of a relatively greater display thickness.

SUMMARY

The methods, apparatus, and devices of this disclosure each have several new and innovative aspects. This summary provides some examples of these new and innovative aspects, but the disclosure may include new and innovative aspects not included in this summary.

The described techniques relate to improved methods, systems, devices, and apparatuses that support a variable diffuser pattern (VDP) for improving color and luminosity uniformity. In particular, a VDP applied to a substrate may be configured to diffuse light from a light source (e.g., a light emitting diode (LED)), where the diffused light may have uniform luminance and uniform color (e.g., corresponding to Commission Internationale de l'Elcairage (CIE) color coordinates, also referred to as chromaticity coordinates) as measured at various distances from the light source. The VDP may include two or more different materials (e.g., two or more nanoparticle inks having different compositions), where each material may have different spectral reflectance and transmittance properties. As an example, the VDP may include a first material that scatters a relatively greater amount of light having a wavelength corresponding to blue light (e.g., as compared to light having other wavelengths, such as respective wavelengths corresponding to red and green light), as well as a second material that scatters a relatively greater amount of light having a wavelength corresponding to red light (e.g., as compared to the respective wavelengths corresponding to blue and green light). Additionally or alternatively, the VDP may include a single ink that includes respective materials having different size distributions of nanoparticles. In other examples, the VDP may include two or more color conversion materials that modify a wavelength of light from a light source.

In any case, because the different materials may enable different scattering properties for light in different wavelengths, applying multiple materials to the substrate to form the VDP (e.g., in accordance with some ratio, density, profile, or the like) may enable enhanced control of the luminance and wavelength of the scattered light. As a result, the use of a VDP including two or more different materials may enable configurations of the VDP such that a concentrated illumination pattern from one or more light sources, for example LEDs such as a planar array of LEDs, may be modified into a uniform illumination plane. Further, when included in backlight designs (e.g., direct-lit backlights), the VDP may enable enhanced light scattering with fewer components in the backlight, thereby decreasing an overall thickness of the backlight while maintaining enhanced luminance and local dimming control.

Accordingly, in a first aspect, an apparatus is disclosed comprising a substrate and a variable diffuser pattern applied to a surface of the substrate and configured to scatter a portion of light output by a light source. The variable diffuser pattern comprises a first material and a second material different than the first material, the first material comprising a first spectral reflectance and a first transmittance, and the second material comprising a second spectral reflectance different than the first spectral reflectance and a second transmittance different than the first transmittance.

In a second aspect, first respective values of the first transmittance and the second transmittance at a first distance from the light source may be less than second respective values of the first transmittance and the second transmittance at a second distance from the light source greater than the first distance, and first respective values of the first spectral reflectance and the second spectral reflectance at the first distance may be greater than second respective values of the first spectral reflectance and the second spectral reflectance at the second distance.

In a third aspect, the first material of the first or second aspect may comprise a first ink that scatters a greater quantity of the light output by the light source in a blue light wavelength relative to a red light wavelength and a green light wavelength, and the second material of the first or second aspect may comprise a second ink that scatters a greater quantity of the light output by the light source in the red light wavelength relative to the blue light wavelength and the green light wavelength.

In a fourth aspect, the blue light wavelength may comprise a wavelength between about 400 nanometers and about 500 nanometers, the red light wavelength may comprise a wavelength between about 620 nanometers and about 700 nanometers, and the green light wavelength may comprise a wavelength between about 520 nanometers and about 570 nanometers.

In a fifth aspect, the first material of any one of the first through the fourth aspects may comprise an ink comprising a first plurality of nanoparticles with a first average size, and the second material of any one of the first aspect through the fourth aspect may comprise the ink comprising a second plurality of nanoparticles with a second average size different than the first average size, the first average size corresponding to a first particle radius that can be between about 50 nanometers and about 400 nanometers, and the second average size corresponding to a second particle radius that can be between about 50 nanometers and about 400 nanometers and may be greater than the first particle radius.

In a sixth aspect, the first material of any one of the first through the fifth aspects may comprise a first color conversion material configured to convert the light output by the light source from a first wavelength to a second wavelength different than the first wavelength and the second material of any one of the first through the fifth aspects may comprise a second color conversion material configured to convert the light output by the light source from the first wavelength to a third wavelength different than the first wavelength and the second wavelength.

In a seventh aspect, one or both of the first material or the second material of any one of the first through the sixth aspect may absorb a second portion of the light output by the light source different than the portion of the light output by the light source that is scattered.

In an eighth aspect, the first material of any one of the first through the seventh aspects may comprise a first thickness profile measured from the surface of the substrate and the second material of any one of the first through the seventh aspects may comprise a second thickness profile different than the first thickness profile and measured from the surface of the substrate, the first thickness profile comprising a first set of thicknesses over a plurality of distances across the substrate and the second thickness profile comprising a second set of thicknesses different than the first set of thicknesses over the plurality of distances across the substrate.

In a ninth aspect, the portion of the light output by the light source and scattered by the variable diffuser pattern of any one of the first through the eighth aspects may have an approximately uniform luminance over a plurality of distances from the light source, and the portion of the light output by the light source and scattered by the variable diffuser pattern may have approximately uniform Commission Internationale de l'Elcairage (CIE) color coordinates over the plurality of distances from the light source.

In a tenth aspect, the first material of any one of the first through the ninth aspects may comprise a first plurality of nanoparticles that are each between about 150 nanometers and about 250 nanometers in diameter and the first spectral reflectance and transmittance is associated with scattering a greater quantity of light having a wavelength corresponding to blue light with respect to light having a wavelength corresponding to red light and light having a wavelength corresponding to green light, and the second material of any one of the first through the ninth aspects may comprise a second plurality of nanoparticles that are each between about 250 nanometers and 350 nanometers in diameter and the second spectral reflectance and transmittance is associated with scattering a greater quantity of the light having the wavelength corresponding to red light with respect to the light having the wavelength corresponding to the blue light and the light having the wavelength corresponding to the green light.

In an eleventh aspect, the light source of any one of the first through the tenth aspects may comprise a light emitting diode configured to generate blue light, and the substrate may comprise a glass material or a plastic material.

In a twelfth aspect, a method is disclosed comprising applying a first material comprising a first spectral reflectance and a first transmittance to a surface of a substrate, and applying to the first material a second material having a second spectral reflectance and a second transmittance different than the first spectral reflectance and the first transmittance, respectively, wherein the first material and the second material comprise a variable diffuser pattern configured to scatter at least a portion of light output by a light source.

In a thirteenth aspect, the first material and the second material of the twelfth aspect may be applied in accordance with a ratio of the first material and the second material that produces scattered light output by the light source having approximately uniform luminance and Commission Internationale de l'Elcairage (CIE) color coordinates.

In a fourteenth aspect, the method of any one of the twelfth through the thirteenth aspects may further comprise applying the second material to the surface of the substrate to create a composite of the first material and the second material.

In a fifteenth aspect, the first material and the second material of any one of the twelfth aspect through the fourteenth aspects may be applied in accordance with a first optical density profile of the first material and a second optical density profile of the second material that produce scattered light output by the light source having an approximately uniform luminance and Commission Internationale de l'Elcairage (CIE) color coordinates.

In a sixteenth aspect, the first material and the second material of any one of the twelfth through the fifteenth aspects may be applied using at least one of an ink-jet printing process or a screen-printing process.

In a seventeenth aspect, an apparatus is disclosed comprising a light source, a substrate, and a variable diffuser pattern applied to a surface of the substrate and configured to diffuse light from the light source, the variable diffuser pattern comprising one or more layers of a first nanoparticle material and a second nanoparticle material different than the first nanoparticle material, the first nanoparticle material comprising a first white ink having a first reflective scattering power associated with scattering greater quantities of light in a blue light wavelength relative to light in a red light wavelength and light in a green light wavelength, and the second nanoparticle material comprising a second white ink having a second reflective scattering power associated with scattering greater quantities of light in the red light wavelength relative to the light in the blue light wavelength and the light in the green light wavelength.

In an eighteenth aspect, the first nanoparticle material of the seventeenth aspect may comprise a first plurality of nanoparticles that are about 200 nanometers in diameter and associated with diffusing a first portion of the light at a wavelength of about 450 nanometers, and the second nanoparticle material of the seventeenth aspect may comprise a second plurality of nanoparticles that are about 300 nanometers in diameter and associated with diffusing a second portion of the light at a wavelength of about 650 nanometers.

In a nineteenth aspect, one or both of the first nanoparticle material or the second nanoparticle material of any one of the seventeenth aspect or the eighteenth aspect may comprise titanium dioxide, silicone dioxide, aluminum oxide, polymethyl methacrylate, or combinations thereof.

In a twentieth aspect, a luminance and Commission Internationale de l'Elcairage (CIE) color coordinates of the light diffused by the first nanoparticle material and the second nanoparticle material of any one of the seventeenth through the nineteenth aspects may be approximately uniform at a plurality of radial positions from the light source.

Additional features and advantages of the aspects disclosed herein will be set forth in the detailed description that follows, and in part will be clear to those skilled in the art from that description or recognized by practicing the aspects described herein, including the detailed description which follows, the claims, as well as the appended drawings. It is to be understood that both the foregoing general description and the following detailed description present aspects intended to provide an overview or framework for understanding the nature and character of the aspects disclosed herein. The accompanying drawings are included to provide further understanding and are incorporated into and constitute a part of this specification. The drawings illustrate various aspects of the disclosure, and together with the description explain the principles and operations thereof.

DETAILED DESCRIPTION

Figure 1:
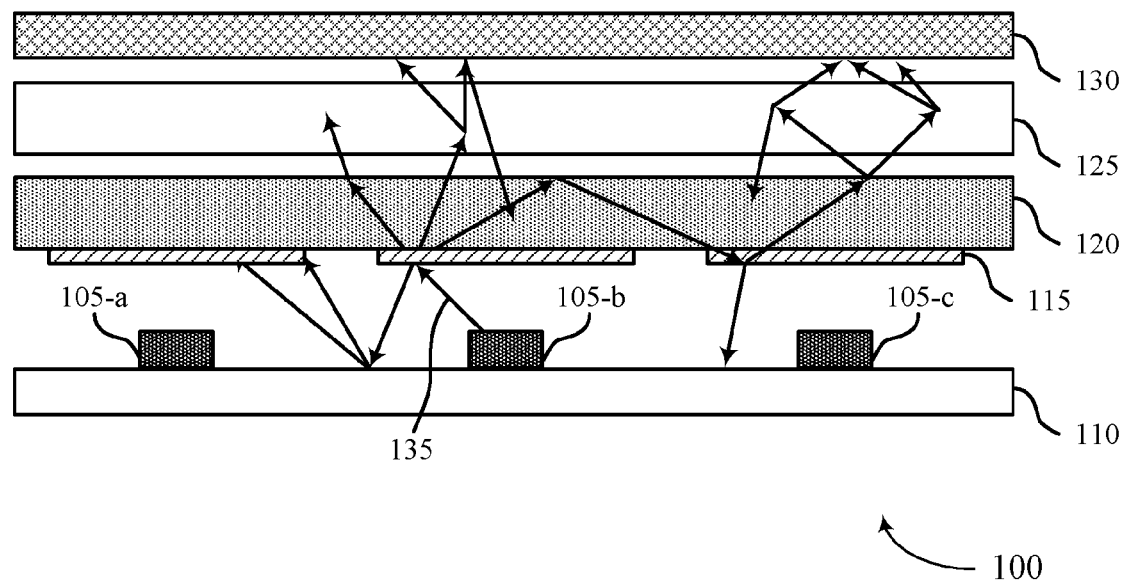
FIG. 1 illustrates an example of an apparatus that supports a variable diffuser pattern (VDP) for improving color and luminosity uniformity in accordance with aspects of the present disclosure.

Liquid crystal displays (LCDs) may have various applications in various personal and industrial electronics, where LCDs may support a relatively wide range of form factors (e.g., both relatively small and relatively large displays) and may be associated with relatively low power consumption, relatively high contrast ratios, relatively increased durability, and relatively enhanced image resolution, among other advantages. As such, a number of modern electronic devices may include an LCD providing an interface for displaying text, images, and the like. As an example, LCDs may be a component of televisions, computer monitors, digital cameras, portable devices (e.g., smart phones, tablets, laptops, portable gaming devices, wearable devices), and instrument panels (e.g., in a vehicle, on machinery, in an aircraft), among other examples. An LCD may include one or more display panels including pixels and a backlight for generating light that is directed through the pixels. In such cases, the light may be directed through a liquid crystal layer of respective pixels, where a composite of pixels generate information displayed on the LCD.

Different backlighting techniques and components may be used to provide the light to the pixels of an LCD. For example, LCD backlighting may be achieved through techniques using different arrangements of light emitting diodes (LEDs), including edge lighting techniques, direct lighting techniques, local dimming techniques, and full-array local dimming techniques. An edge-lit LCD may incorporate multiple light emitting diodes (LEDs) that are positioned at or near a perimeter of the display, and light from the LEDs may be spread over a display panel using, for example, a waveguide, a lightguide, a diffuser, among other examples. Alternatively, direct-lit LCDs may include an array (e.g., a two-dimensional array) of LEDs behind the display panel, where diffused light from the LEDs provides lighting to the liquid crystal layer of the pixels. Here, backlights for a direct-lit LCD may include a number of layered components used to diffuse and modify the light output from the array of LED. For example, a backlight may include a light source (e.g., an LED), a diffuser (e.g., a thick plastic or glass plate), and one or more other components or films, such as a quantum dot film (e.g., a quantum dot enhancement film), among other examples.

LCDs utilizing such backlighting techniques may have various tradeoffs in performance and form factor. For example, edge-lit LCDs may be thinner than direct-lit LCDs, but may lack some control in two-dimensional local dimming (e.g., as compared to direct-lit LCDs). Likewise, direct-lit LCDs may provide improved luminance and local dimming control (e.g., as compared to edge-lit LCDs) at the cost of a greater display thickness. In such cases, the thickness of direct-lit LCDs may be based on the number of components in the backlight, among other factors. Thus, by modifying the efficiency and quantity of the materials and components included in the backlight of direct-lit LCDs, the overall thickness of the display may be reduced, resulting in a thinner display that also maintains the advantages of direct-lit LCDs.

As described herein, a variable diffuser pattern (VDP) may be applied to one or more surfaces of a substrate to enable enhanced light diffusion in LCD backlights and other applications. In such cases, the substrate including the VDP may be used as a diffusing component in the backlight, providing various advantages (e.g., over thicker plastic or glass plates used with other different designs). The described VDP may include two or more materials (e.g., two or more white nanoparticle inks), where each material may have a unique spectral reflectance and transmittance. The different spectral reflectance and transmittance of each material may enable an application of the VDP such that scattered light from a light source (e.g., an LED) achieves uniform color (e.g., color corresponding to chromaticity coordinates of the Commission Internationale de l'Elcairage (CIE) color system) and luminance at an illumination plane (e.g., compared to a color and luminance resulting from other light diffusion techniques). Specifically, aspects of the present disclosure may enable simultaneous optimization of color uniformity and luminance uniformity, which may not be achieved when using, for example, a single material. That is, a VDP including a single ink may be capable of achieving color uniformity or luminance uniformity, but not both. As such, the use of the described VDP including multiple materials (e.g., multiple inks) may provide enhanced control over how light is scattered from a light source, while also enabling the replacement of diffuser components, thereby reducing the thickness of components of a backlight.

Aspects of the disclosure are initially described in the context of substrates with an applied VDP that includes two or more different materials. Aspects of the disclosure are further illustrated by and described with reference diagrams showing scattering power of nanoparticle materials, optical density profiles, uniform color and luminosity distributions, color balancing techniques using color conversion materials, and flow charts.

This description provides examples, and is not intended to limit the scope, applicability or configuration of the principles described herein. Rather, the ensuing description will provide those skilled in the art with an enabling description for implementing various aspects of the principles described herein. As can be understood by one skilled in the art, various changes may be made in the function and arrangement of elements without departing from the application.

It should be appreciated by a person skilled in the art that one or more aspects of the disclosure may be implemented in a system to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

FIG. 1 illustrates an example of an apparatus 100 that supports a VDP for improving color and luminosity uniformity in accordance with aspects of the present disclosure. The apparatus 100 may include or be part of a backlight (e.g., of a direct-lit LCD). For example, the apparatus 100 may include multiple components (e.g., stacked components, layered components) that may diffuse or otherwise modify light from multiple light sources 105 of the backlight. As such, the apparatus may include one or more light sources 105 (e.g., a light source 105-a, a light source 105-b, a light source 105-c), a reflective component 110, and a VDP 115 applied to at least one surface of a substrate 120. Further, the apparatus 100 may in some examples include a diffuser 125 and an optical stack 130.

The light sources 105 may include or be examples of an LED. For instance, the light sources 105-a, 105-b, and/or 105-c may be examples of LEDs, a mini-LEDs, micro-LEDs, organic LEDs, red-green-blue (RGB) LEDs, addressable LEDs, surface mounted LEDs, or other type of LEDs. A mini LED may refer to an LED that has a size between about 500 micrometers (μm) and 100 μm, whereas a micro LED may refer to an LED that has a size less than about 100 μm. In some examples, the light sources 105 may be another type of light source different than an LED. Each light source 105 may be configured to output light at various wavelengths, for example, between about 100 nanometers (nm) and about 700 nm. In some aspects, the light source 105-a, light source 105-b, and light source 105-c may each be configured to generate and output visible blue light, such as light at a wavelength of about 450 nm. Each light source 105 may, however, generate and output light at other wavelengths, and the examples described herein should not be considered limiting to the scope of the claims or the disclosure.

In some cases, a plurality of light sources 105 (e.g., including the light source 105-a, light source 105-b, and light source 105-c) may be coupled with (e.g., mounted or otherwise secured to) a substrate that includes the reflective component 110. For instance, the plurality of light sources 105 may be arranged in a two-dimensional array and attached to the substrate. The reflective component 110 may be an example of or include a reflective panel (e.g., a mirror, a reflective film). For example, the reflective component 110 may include a metallic layer that reflects light (e.g., light output by the light sources 105), and the metallic layer may include silver, platinum, gold, copper, or other metallic materials. In other examples the reflective component 110 may include one or more layers of reflective dielectric materials or reflective inks.

The substrate 120 may be an example of an optically transmissive substrate (e.g., a substrate that enables the transmission of light at various wavelengths). For example, the substrate 120 may be optically transmissive to one or more wavelengths of light output by the light sources 105 such that electromagnetic radiation from a light source 105 passes through the substrate 120. For instance, the transmittance of the substrate 120 may be greater than some percentage (e.g., greater than about 80 percent, greater than about 85 percent, or greater than about 90 percent) for normal incident light of a wavelength between about 400 nm and 700 nm. In other examples, at least a portion of light 135 output by a light source 105 may be transmitted through the substrate 120. The substrate 120 may include or be an example of a glass material (e.g., a glass plate) including, for example, an aluminosilicate glass material, an alkali-aluminosilicate glass material, an aluminoborosilicate glass material, an alkali-aluminoborosilicate glass material, a soda lime glass material, a borosilicate glass material, an alkali-borosilicate glass material, or other types of glass materials. In other examples, the substrate 120 may be an example of another type of material or multiple materials. For instance, the substrate 120 may include a plastic material, such as poly(methyl methacrylate) (PMMA), polyethylene terephthalate (PET), polycarbonate, polyethylene naphthalate (PEN), or the like. The substrate 120 may optionally include a uniform diffuser pattern (UDP) applied to a surface of the substrate 120 (e.g., an upper surface, as illustrated), where the UDP may be used to modify or manage an alignment of light transmitted by the substrate 120. In some examples, the VDP 115 may be applied to an upper surface (e.g., as illustrated) of the substrate 120 and the UDP may be applied to a lower surface (e.g., as illustrated) of the substrate 120.

As described herein, the VDP 115 applied to a surface of the substrate 120 (e.g., a bottom surface, as illustrated) may include two or more different materials configured to diffuse light from a light source 105, where the diffused light may have luminance uniformity and color uniformity measured at various distances from the light source 105. In some examples, the two or more different materials of the VDP 115 may be two or more nanoparticle inks having different compositions. An ink may be a solvent-based ink, a latex-based ink, or a ultraviolet (UV)-based ink (e.g., inks that are dried or cured using UV radiation, such as light having a wavelength between about 10 nm to 400 nm), among other types of inks. For example, a solvent-based ink refers to a substance that comprises particles of a material and solvents that disperse the particles. The particles may include a colored material (e.g., pigment, dye) that absorbs some wavelength(s) of light, where other wavelength(s) of light are reflected or scattered by the colored material. For example, a red ink refers to a substance including a solvent and particles that absorb light having a wavelength corresponding to red light (e.g., a wavelength between about 620 nm and about 700 nm) and reflects and/or scatters light at different wavelengths, whereas a white ink refers to a substance including a solvent and particles that absorb a multiple wavelengths of light (e.g., wavelengths between about 400 nm and about 700 nm).

Each material may have unique spectral reflectance and transmittance properties. As an example, the VDP 115 may include a first material (e.g., a first ink such as a white ink) that scatters a greater amount of light having a wavelength (e.g., about 450 nm) corresponding to a first type of light, such as blue light (e.g., as compared to light having other wavelengths, such as respective wavelengths corresponding to red light (e.g., about 650 nm) and a second type of light, such as green light (about 550 nm)), as well as a second material (e.g., a second white ink) that scatters a greater amount of light having a wavelength (e.g., about 650 nm) corresponding to a third type of light, such as red light (e.g., as compared to the wavelengths corresponding to blue and green light). Additionally or alternatively, the different materials of the VDP 115 may include a single ink with particles having different size distributions. The ink may include a first material with nanoparticles in a first range in size, such as between about 50 nm and 350 nm, and a second material with nanoparticles in a second range in size, such as between about 100 nm and 400 nm, where the nanoparticles of the first material are different sizes (e.g., smaller) than the nanoparticles of the second material. As an example, the nanoparticles of the first material may have an average radius of about 90 nm and the nanoparticles of the second material may have an average radius of about 150 nm. In other examples, the VDP 115 may include two or more color conversion materials (e.g., quantum dots, phosphors) that modify a wavelength of light from a light source 105.

The VDP 115 may include the two or more materials applied to the substrate 120 at respective locations that each relate to or correspond to locations of the light sources 105. In particular, the materials of the VDP 115 may be applied to the substrate 120 at a first location that corresponds to a location of the light source 105-a, at a second location that corresponds to a location of the light source 105-b, and at a third location that corresponds to a location of the light source 105-c. While each VDP 115 is illustrated as a layer on a surface of the substrate 120, the VDP 115 may have a variable thickness across the surface of the substrate 120, where a greater quantity of one or more materials of each VDP 115 may be applied in respective locations corresponding to (e.g., opposite from) respective light sources 105 than in other locations. The VDP 115 may have a variable opening aperture while the thickness of the VDP 115 is about constant across the surface of the substrate 120. For example, the VDP 115 may be applied with an approximately constant thickness on the surface of the substrate 120, and one or more areas of the VDP 115 may have openings of various sizes through which light from a light source 105 passes without being affected by the VDP 115. In some cases, the VDP 115 at each location may be applied such that the VDP 115 is approximately aligned with each light source 105 (e.g., within some horizontal and vertical threshold). Further aspects of the VDP 115 and its properties are described in detail with respect to FIGS. 2-3, 4A, 4B, 5A, 5B, 6A, 6B, and 6C.

The diffuser 125 may be an example of a substrate including a glass material, a plastic material, or other materials, and the diffuser 125 may be an example of a diffuser plate or a diffuser sheet. For instance, the diffuser 125 may be an inhomogeneous plastic plate with a surface treatment, where the diffuser 125 may be configured to provide both internal and surface scattering. In some cases, the diffuser 125 may have a thickness that is less than a thickness of some other diffusers used in backlights that exclude the VDP 115. Put another way, the incorporation of the VDP 115 in the apparatus 100 may enable the use of a thinner diffuser 125 (e.g., a diffuser plate) than would be needed without the VDP 115 due to the enhanced light scattering provided by the VDP 115. As such, the apparatus 100 may achieve a thinner size due to the reduction in size of one or more components. In other examples, the diffuser 125 may be excluded from the apparatus 100 based on the inclusion of the VDP 115. That is, the substrate 120 and the VDP 115 may scatter the light output by the light sources 105 such that additional scattering by the diffuser 125 may be unnecessary. In such cases, the overall thickness of the apparatus 100 may be further reduced.

One or more optical films (not shown) may be included in the apparatus 100, which may be located on either side of (e.g., above or below, as illustrated) the diffuser 125. The one or more optical films may include, a diffuser film, a quantum dot film, a color conversion film, a prismatic film, other types of films, or combinations thereof. Similarly, the optical stack 130 (e.g., an optical film stack) may include one or more optical films. For instance, the optical stack 130 may be an example of a brightness enhancement film (BEF), a dual BEF (DBEF), or the like. A BEF and DBEF refers to a prismatic film for managing an angular output of incident light and may include materials that increase the brightness of light output by the light sources 105.

Light 135 output by each light source 105 may be directed toward, and be incident on, the VDP 115, and the VDP 115 may scatter the light 135. As shown, a path that the light 135 takes upon interacting with one or more components of the apparatus 100 may be complex, including multiple locations and interfaces where a direction of the light 135 may be modified, for example, through scattering, reflection, refraction, or the like. As an example, light 135 output by the light source 105-b may have multiple paths, including direct paths, scattered paths, and recirculated paths, until the light 135 is transmitted, for example, from the diffuser 125 (e.g., including a quantum dot film) and/or the optical stack 130. As an illustrative example, some portion of the light 135 output from the light source 105-b may be backscattered (e.g., a diffuse reflection of the light 135 in some direction corresponding to a direction from which the light 135 came) by the substrate 120 and/or the VDP 115, which may be recirculated (e.g., redirected toward the substrate 120) by reflection from the reflective component 110. In addition, there may be forward scattering of some portion of the light 135 (e.g., a diffuse reflection of the light in approximately the same direction from which the light 135 came) via the VDP 115. Further light guiding (e.g., by way of internal reflection) may occur within the substrate 120 and, in some cases, the guided light may be recirculated via the VDP 115. Some portion of light may be transmitted by the substrate 120 (e.g., using a UDP applied to a surface of the substrate 120 that may scatter the extracted light) and directed toward the diffuser 125. In such cases, a quantum dot film may enable color conversion (e.g., from blue light to red light and/or green light) and further scattering of the light from the substrate 120. In some examples, light from the diffuser 125 and/or the quantum dot film may be recirculated by the optical stack 130 (e.g., a BEF). The paths of the light 135 may be based on a position (e.g., a lateral position) of each light source 105.

As the light 135 is transmitted through the apparatus 100, various paths of the light 135 may result in non-uniformity in one or both of color and luminance (e.g., in cases where the VDP 115 is not included in the apparatus 100). More generally, there may be an attenuation of colors (e.g., through scattering) the further the light 135 travels from the light source 105-b. In some examples, some fraction of color conversion (e.g., blue-green color conversion, blue-red color conversion) in a quantum dot film may be based on a mean path length of the light 135 transmitted through the quantum dot film, which may affect color uniformity of light output by the apparatus 100. In other cases, some wavelengths of light (e.g., red light, green light) may be backscattered by the diffuser 125, where the percentage of backscatter may be wavelength and position dependent, which may also affect color uniformity of the light transmitted by the apparatus 100. Moreover, in cases where the apparatus 100 excludes the VDP 115, a luminance (e.g., a radial luminance) of light output by the apparatus 100 may be non-uniform, and may decrease as a distance from the light source increases (e.g., as a radius increases). Similarly, different radial tristimulus values (e.g., radial tristimulus X, tristimulus Z values) may have different profiles at different radial positions. In such cases, color intensity may decrease as the distance from the light source 105 increases, where the intensity of one wavelength of light (e.g., red light having a wavelength between about 620 nm and 700 nm) may decrease at a different rate than another wavelength of light (e.g., blue light having a wavelength between about 380 nm and about 500 nm) with increased distance from the light source 105. Moreover, in cases where a VDP 115 is excluded from a backlight (or some sub-portion of a backlight), the diffuser 125 may be primarily used to scatter light from the light sources. But the diffuser 125 may be thick and/or may be located a large distance away from the light sources 105, thereby increasing the overall thickness of the apparatus 100.

Radial luminance refers to respective luminance values measured at different radii (e.g., radial positions) from an origin of a two-dimensional spatial distribution of light output by a light source. In such cases, the origin corresponds to a position of the light source (e.g., within some threshold or tolerance). Likewise, radial color values refer to respective measurements of light color (e.g., wavelength) at the different radii (e.g., radial positions) from the origin of the two-dimensional spatial distribution. Such measurements may be performed by using spectrophotometry, colorimetry, or other techniques. The measurements may also be achieved after light is transmitted by one or more components, for example, after the light is transmitted by the optical stack 130, after the light is transmitted by the diffuser 125, and/or after the light is transmitted by the substrate 120. Tristimulus values may refer to X, Y, and Z coordinates of tristimulus color corresponding to color receptors of the human eye. In such cases, a tristimulus values may be associated with a light intensity measurement based on three primary color values (e.g., red, green, and blue represented as X, Y, and Z coordinates).

As described herein, a backscatter profile of the VDP 115 may be designed such that the radial luminance of outputted light becomes uniform. In such cases, backscatter may be increased in a region by making the VDP 115 thicker in that region than in other regions. Moreover, using multiple different materials (e.g., two or more white inks), one having enhanced reflectance for tristimulus X and one having enhanced reflectance for tristimulus Z, both radial tristimulus profiles can be made uniform. In such cases, the VDP 115 may provide enhanced spectral reflectance and a first transmittance properties such that the VDP 115 has a lower transmittance and a greater reflectance of the light 135 closer to the light source 105 than away from the light source 105. Correspondingly, the VDP may have a greater transmittance and a lower reflectance of the light 135 further away from the light source 105 than closer to the light source 105. By including different materials having different reflectance and transmittance properties in the VDP 115, different wavelengths of the light 135 may be reflected or transmitted differently at different distances from the light source 105. As such, a composition, placement, thickness profile, and optical density profile of the VDP 115 may be configured to achieve approximately uniform (e.g., within some threshold) CIE color coordinates and luminosity for scattered light. Diffusion of light provided by the VDP 115 may enable more efficient and controlled scattering with improved properties (e.g., for use in LCDs and other applications), which may not be possible with a VDP including a single material (e.g., where either color uniformity or luminance uniformity might be possible, but not both). The VDP 115 may also enable a relatively thinner design of the apparatus 100 (e.g., an LCD backlight) compared to apparatuses that does not include the VDP 115. For example, efficient scattering provided by the VDP 115 may enable a decreased number of light sources 105 or other components in the apparatus 100, resulting in reduced power consumption and reduced cost.

Figure 2:
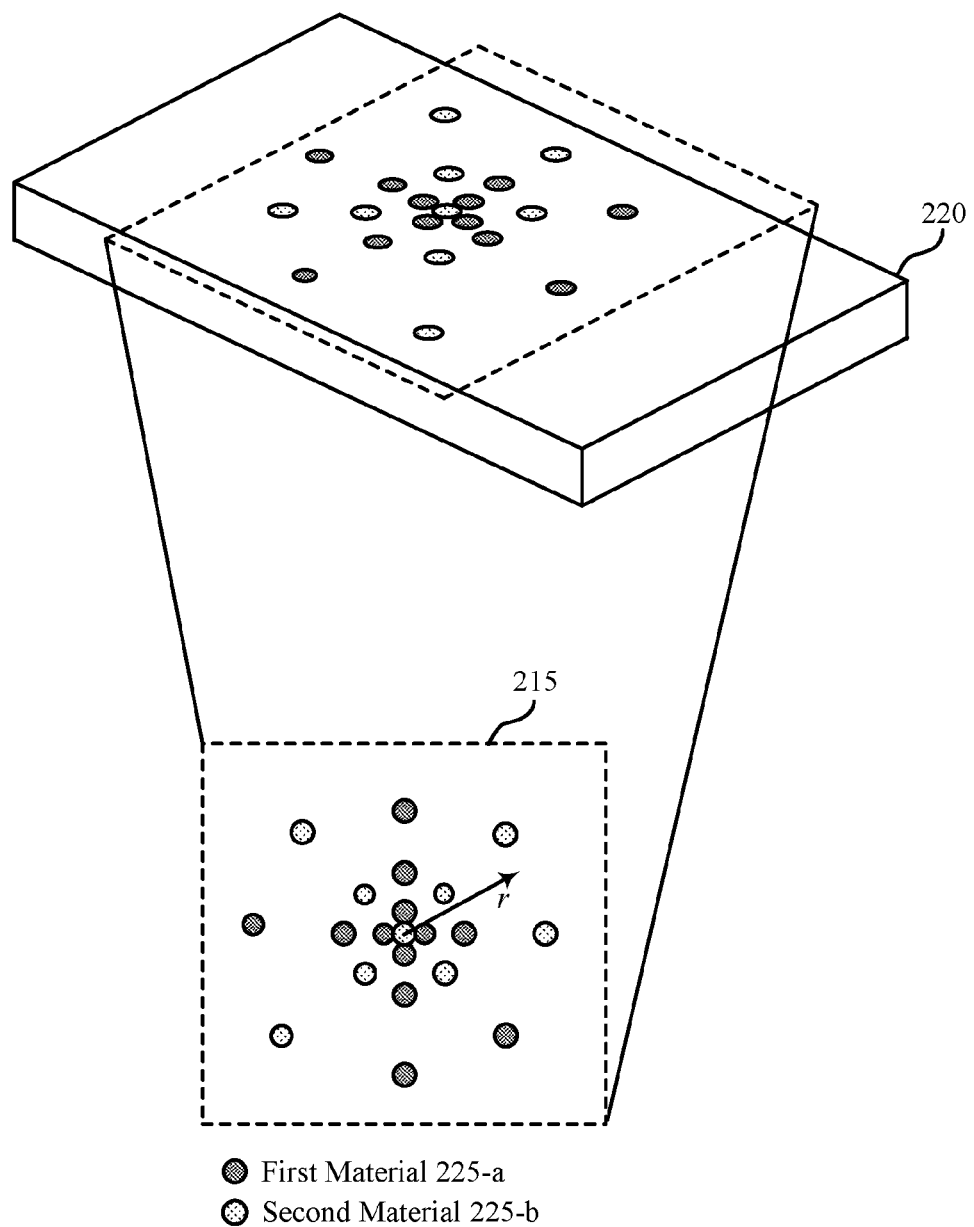
FIG. 2 illustrates an example of an apparatus that supports a VDP for improving color and luminosity uniformity in accordance with aspects of the present disclosure.

FIG. 2 illustrates an example of an apparatus 200 that supports a VDP for improving color and luminosity uniformity in accordance with aspects of the present disclosure. The apparatus 200 may include a VDP 215 that is applied to one or more surfaces of a substrate 220. In some examples, the VDP 215 and the substrate 220 may be examples of the VDP 115 and the substrate 120 described with reference to FIG. 1. For instance, the VDP 215 and the substrate 220 may be components of a backlight assembly (e.g., an LCD backlight assembly).

The VDP 215 may refer to a pattern of materials 225 that varies in space at some scale (e.g., 0.2 millimeters or more). The VDP 215 may have properties that enable the diffusion of light from a light source through spectral reflection and transmission. The VDP 215 may have a circular shape and may have a range of sizes, for example, between 5 and 25 millimeters. In other examples, the VDP 415 may have other shapes or shape profiles, such as an elliptical shape, a rectangular shape, a hexagonal shape, an asymmetric shape, a non-geometric shape, or the like. In some cases, a shape and size of the VDP 215 may be based on a light source (e.g., an LED) for which the VDP 215 is configured to scatter light. For example, one VDP 215 may have a first size corresponding to a micro-LED and another VDP 215 may have a second, different size corresponding to a mini-LED. The size and shape of the VDP 215 may be based on other parameters or aspects of the apparatus 200 or other factors, such as a pixel pitch.

The VDP 215 may include two or more different materials that each have a different spectral reflectance and transmittance. In some examples, a reflectance and a transmittance of a material may be measured using various techniques including spectrophotometry (e.g., ultraviolet (UV)-visible spectrophotometry) or other methods. As an example, the VDP 215 may include a first material 225-a and a second material 225-b, where the first material 225-a (e.g., a white ink) may have a first spectral reflectance and a first transmittance, and the second material 225-b (e.g., another white ink) may have a second spectral reflectance (e.g., different than the first spectral reflectance) and a second transmittance (e.g., different than the first transmittance). A white ink may refer to an ink including nanoparticles of some material, where the ink is not dyed with a pigment of another color. Based on the different reflectance and transmittance properties of the first material 225-a and the second material 225-b, the VDP 215 may be configured such that the first material 225-a and the second material 225-b are applied in different ways so as to achieve uniform color and luminance of diffused light from a light source (e.g., an LED). In particular, the first material 225-a may be applied with a varying density of the first material 225-a at some radial distances (e.g., as measured with respect to an origin that may correspond to a position of an LED) and the second material 225-b may be applied with a varying density of the second material 225-b at the radial distances, where the different densities may be based on the optical properties (e.g., reflectance and transmittance) of the different materials 225. The different densities of the different materials 225 may therefore result in a varying thickness of the VDP 215 at a location where the VDP 215 is applied.

As an illustrative example, the first material 225-a may include a white ink (e.g., an ink having a white pigment) with greater backscatter in blue (e.g., in wavelengths corresponding to blue light, such as wavelengths between about 380 nm and 500 nm) compared to backscatter of other wavelengths of light, and the second material 225-b may include another white ink with greater backscatter in red (e.g., in wavelengths corresponding to red light, such as wavelengths between about 620 nm and about 700 nm) compared to backscatter of other wavelengths of light. A radial density (e.g., a density of a material 225 at respective radii) of the second material 225-b may decrease more slowly (e.g., at increasing radiuses) when compared to a radial density of the first material 225-a. Put another way, the first material 225-a associated with increased backscatter in blue light wavelengths (e.g., as compared to backscatter in red light and green light wavelengths) may have an increased density near an origin or a central area corresponding to the light source compared to locations more distant from the origin or central area. Further, the second material 225-b associated with increased backscatter in red light wavelengths (e.g., as compared to backscatter in blue light and green light wavelengths) may have a different (e.g., reduced) density at the same corresponding locations as the first material 225-a. Because radial backscatter at red wavelengths may decrease differently (e.g., more slowly) than radial backscatter at blue wavelengths, the VDP 215 applied with varying densities of the first material 225-a and the second material 225-b may result in uniform (or very nearly uniform) radial tristimulus values. A total radial density of the first material 225-a and the second material 225-b may likewise be configured to achieve uniform radial luminance. Accordingly, the first spectral reflectance of the first material 225-a may be greater, and the first transmittance may be lower, at distances closer to the light source than at distances farther away from the light source. Similarly, the second spectral reflectance of the second material 225-a may be greater, and the second transmittance may be lower, at the distances closer to the light source than at the distances farther away from the light source.

In some examples, the first material 225-a and the second material 225-b may be composed of a similar material (e.g., a same ink material) that has two or more different size distributions of nanoparticles. For instance, the first material 225-a may include nanoparticles having a first size distribution described at least in part by a first average size (e.g., a first average radius R1) and a first standard deviation SD1, or that may fall within a first range of sizes. The second material 225-b may include nanoparticles having a second size distribution described at least in part by a second average size (e.g., a second average radius of R2) and a second standard deviation SD2, or that may fall within a second (e.g., different) range of sizes. R1 may be different (e.g., less) than R2. In some examples, R1 may be about 100 nm, or may be between about 50 nm and about 150 nm, or some other size (e.g., between about 50 nm and about 400 nm). Additionally, R2 may be about 150 nm, or may be between about 100 nm and about 200 nm, or some other size (e.g., between about 50 nm and about 400 nm). SD1 and SD2 may the same or different. As an example, SD1 may be approximately equal to SD2 (e.g., 10 nm). Alternatively, SD1 may be equal to 10 nm and SD2 may be equal to 15 nm. Other values of the standard deviations may be possible. In such cases, the standard deviation of each size distribution (e.g., for the first material 225-a and the second material 225-b), may be approximately equal to some percentage of the average size (e.g., R1, R2). In some cases, the two materials may be different from each other (e.g., regardless of including a same type of ink) when the first material 225-a and the second material satisfy $|R1-R2|>2\times SD1$ and $|R1-R2|>2\times SD2$.

In some aspects, the VDP 215 may additionally or alternatively include a third material (not shown), where the third material may include nanoparticles having a third size distribution described at least in part by a third average size (e.g., a third average radius R3) and a third standard deviation SD3, or that may fall within a third (e.g., different) range of sizes. In such cases, the three different materials (e.g., the first material 225-a, the second material 225-b, and the third material) may be used as respective controls for the diffusion of light from a light source. In particular, the first material 225-a may be used to achieve approximately uniform radial luminance. However, there may be cases where the first material 225-a may not achieve radial color uniformity by itself. Thus, the second material 225-b may be an ink having enhanced reflectance for red light (e.g., light at a wavelength of about 625 nm, where the red color of the light corresponds to some CIE chromaticity coordinates) and the third material may be an ink having enhanced reflectance for blue light (e.g., light at a wavelength of about 430 nm, where the blue color of the light corresponds to some CIE chromaticity coordinates). Further, the luminance reflectance of the first material 225-a, the second material 225-b, and the third material may be approximately equal. Here, the second material 225-b and the third material applied to the substrate 220 may enable the VDP 215 to produce a uniform color (e.g., corresponding to CIE chromaticity coordinates) of the diffused light, while all three materials may enable the VDP 215 to produce radial luminance uniformity for the diffused light. To preserve the luminance uniformity, a thickness of the second material 225-a applied to the substrate 220, plus a thickness of the third material applied to the substrate 220, may be about equal to the thickness of the first material 225-a. A ratio of thicknesses of the second material 225-a and the third material may be adjusted to achieve radial color uniformity for light diffused by the VDP 215 (e.g., a color of the diffused light may have uniform CIE chromaticity coordinates).

The VDP 215 may additionally or alternatively include two or more different materials that absorb light. For example, the first material 225-a and the second material 225-b may have properties resulting in absorbing some portion of light from the light source. In such cases, each material 225 may absorb one or more wavelengths of light in such a way that achieves both radial luminosity uniformity and radial color uniformity (e.g., a uniform color of the light corresponding to CIE chromaticity coordinates). In other examples, the VDP 215 may include different color conversion materials, which may include quantum dots, phosphors, or the like.

The VDP 215 may be applied to the substrate 220 (e.g., an optically transmissive substrate) using various techniques including, for example, inkjet printing, screen printing, and/or silk screen printing, among other printing techniques. As an example, two or more different white inks (e.g., the first material 225-a and the second material 225-b) may be selectively applied through different nozzles, where the applied pattern (e.g., the VDP 215) may be configured to optimize both color and luminance uniformity of the scattered light. In some cases, the VDP 215 may be applied to a top surface of the substrate 220, or a bottom surface of the substrate 220 (e.g., corresponding to an orientation of the substrate 120 described with reference to FIG. 1), or both. In some examples, the VDP 215 may be cured after being applied to the substrate 220.

In some examples, the second material 225-b may be applied to (e.g., on top of) the first material 225-a. Additionally or alternatively, the second material 225-b may be applied to the surface of the substrate 220. Additionally or alternatively, the second material 225-b may be applied concurrent with the first material 225-a being applied to the surface of the substrate 220. In various examples, both the first material 225-a and the second material 225-b may be applied to form a composite material that enables the uniform luminance and color of scattered light, as described herein. In some aspects, the first material 225-a and the second material 225-b may be applied to the substrate in accordance with a ratio of the two materials 225, where the ratio may be configured based on one or more light sources and how light from those light sources is desired to be scattered.

Figure 3:
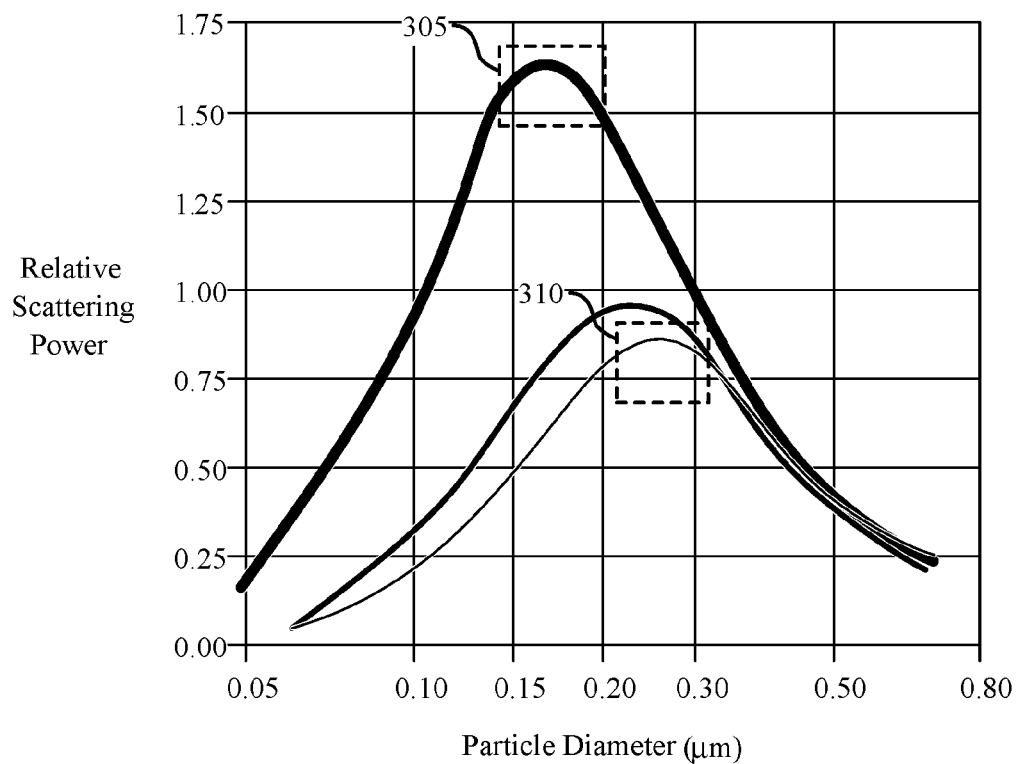
FIG. 3 illustrates an example of relative scattering power for a nanoparticle material that supports a VDP for improving color and luminosity uniformity in accordance with aspects of the present disclosure.

FIG. 3 illustrates an example of relative scattering power 300 for a nanoparticle material that supports a VDP for improving color and luminosity uniformity in accordance with aspects of the present disclosure. A comparison of scattering power for blue, green, and red light is shown. Scattering power refers to the intensity at which light is scattered by a particle. For example, how a particle scatters light may be based on a refractive index and a diameter of the particle, as well as the refractive index of a surrounding medium. As such, particles having different sizes may scatter light differently, resulting in different scattering powers. Likewise, and as illustrated, a particle may scatter different wavelengths of light with different intensities.

As described herein, a VDP applied to a substrate may be configured to diffuse light from a light source (e.g., an LED), where the diffused light may have luminance uniformity and color uniformity measured at various distances from the light source. The VDP may include two or more different materials (e.g., two or more nanoparticle inks having different compositions), where each material may have different spectral reflectance and transmittance properties. As an example, the VDP may include a first material that scatters a greater amount of light having a wavelength corresponding to blue light (e.g., as compared to light having other wavelengths, such as respective wavelengths corresponding to red and green light), as well as a second material that scatters a greater amount of light having a wavelength corresponding to red light (e.g., as compared to the wavelengths corresponding to blue and green light).

The selection of different materials for the VDP may accordingly be based on a size of the nanoparticles and a peak scattering provided by such nanoparticles. Put another way, by selecting the dimension of the scattering particles, the wavelength of light that is scattered may be affected. In the example illustrated by FIG. 3, the VDP may be made at least in part of nanoparticles including titanium dioxide ($TiO_2$). In this example, titanium dioxide nanoparticles having different diameters may scatter different wavelengths of light more effectively than others. Specifically, nanoparticles having a diameter between 150 μm and 200 μm may scatter light in a blue light wavelength (e.g., about 430 nm) with greater power than other wavelengths (e.g., light in a green light wavelength (e.g., about 520 nm) and light in a red light wavelength (e.g., about 625 nm)), which may correspond to peak scattering 305. Similarly, nanoparticles having a diameter between 210 μm and 300 μm may scatter light in the red light wavelength (e.g., about 625 nm) with greater power than other wavelengths (e.g., light in a green light wavelength (e.g., about 520 nm) and light in a blue light wavelength (e.g., about 430 nm)), which may correspond to peak scattering 310. In other cases, nanoparticles may be selected based on other parameters or criteria different than a diameter that results in peak scattering, as the use of two or more different nanoparticle materials may provide multiple degrees of freedom for configuring a VDP for color and luminance uniformity.

By determining the scattering of different wavelengths of light for different nanoparticle sizes, different materials may be selected for the two or more materials of the VDP described herein. As an example, a first material of the VDP may include a $TiO_2$ ink with a relatively high concentration of particles that are about 200 nm in diameter and that have a peak in scattering near 450 nm. A second material of the VDP may include a $TiO_2$ ink with a high concentration of particles that are about 300 nm in diameter (e.g., compared to particles having a different diameter) and that have a peak in scattering near 650 nm. These examples, however, are provided for illustrative purposes, and other materials having different sizes and peak scattering may be used. For instance, the VDP may include inks that include silicon dioxide ($SiO_2$) or some other materials (e.g., aluminum oxide, polymethyl methacrylate), which may have different scattering properties for light at different wavelengths. In some cases, the first material of the VDP may include a $TiO_2$ ink and the second material may include an $SiO_2$ ink. Other combinations of materials and material compositions are possible and, in any case, the examples provided herein should not be considered limiting to the scope of the disclosure or the claims.

Figure 4A:
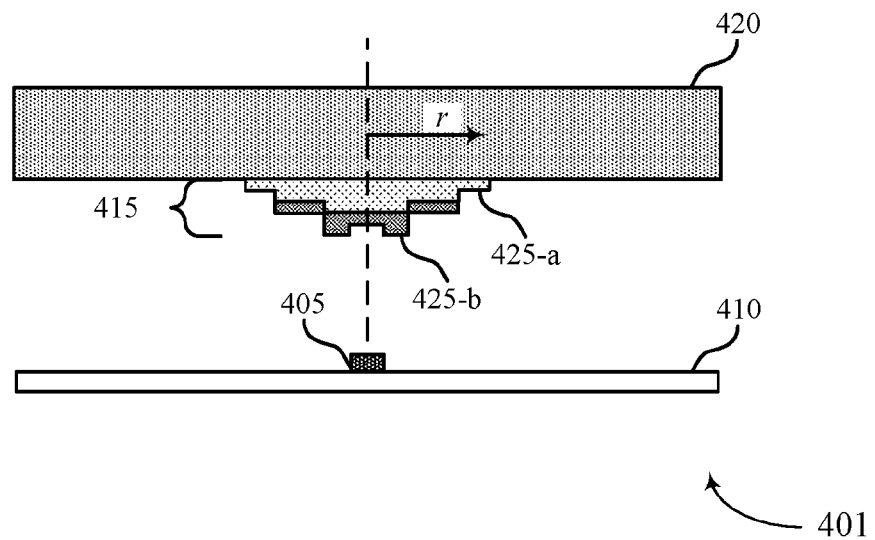
FIGS. 4A and 4B illustrate examples of an apparatus and optical density profile that support a VDP for improving color and luminosity uniformity in accordance with aspects of the present disclosure.
Figure 4B:
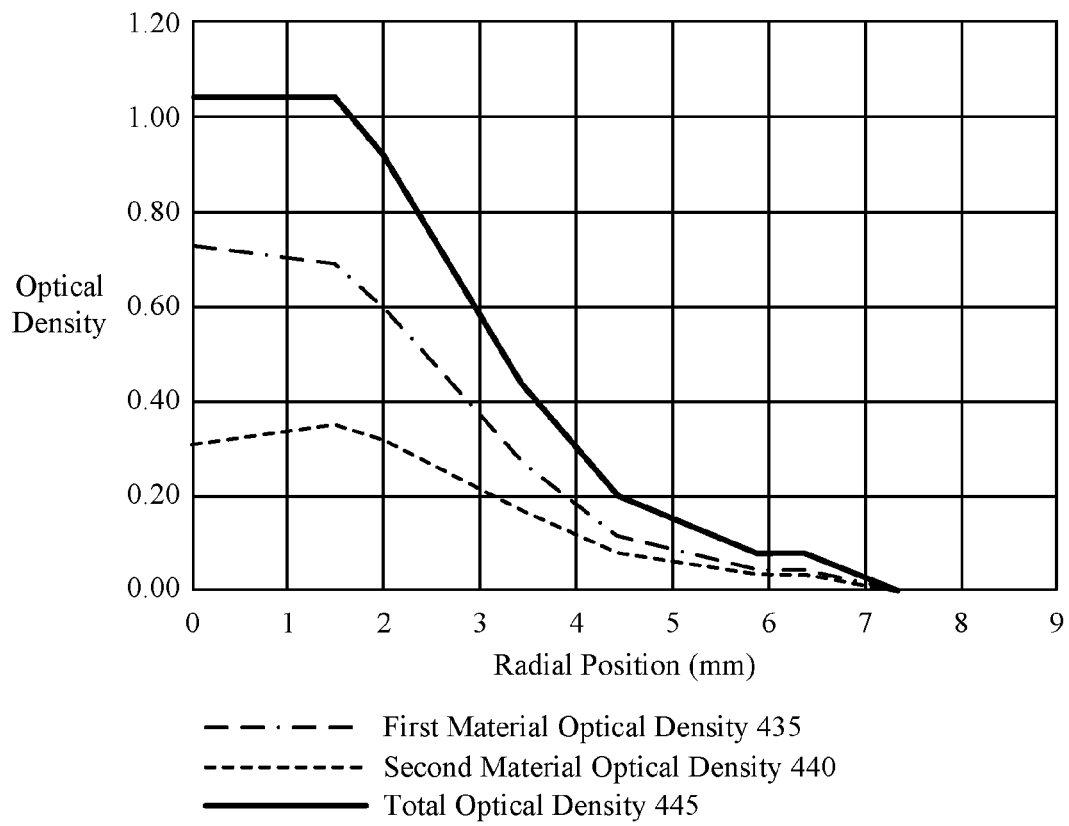

FIGS. 4A and 4B illustrate examples of an apparatus 401 and optical density profile 402, respectively, that support a VDP for improving color and luminosity uniformity in accordance with aspects of the present disclosure.

The apparatus 401 of FIG. 4A may be an example of the apparatus 100 described with reference to FIG. 1 and the apparatus 200 described with reference to FIG. 2. For instance, the apparatus 401 may be an example of an LCD backlight or a portion of an LCD backlight. The apparatus 401 may include a light source 405, a reflective component 410, and a VDP 415 applied to a surface of a substrate 420, which may be examples of the corresponding components described with reference to FIGS. 1 and 2. The VDP 415 may accordingly support the use of at least a first material 425-*a* and a second material 425-*b* having unique spectral reflectance and transmittance, where the spectral reflectance and transmittance of each material 425 may result in the VDP 415 scattering light from the light source 405 (e.g., an LED) that achieves both uniform color and luminance at an illumination plane.

FIG. 4A illustrates a cross-sectional view of the VDP 415 including a first material 425-*a* and a second material 425-*b*, where the first material 425-*a* and the second material 425-*b* may have different reflectance and transmittance. In addition, the first material 425-*a* and the second material 425-*b* may be applied with different optical densities that are configured to achieve uniform luminance and color when scattering light from the light source 405. As an example, and as similarly described with reference to FIG. 2, the first material 425-*a* may be applied to the substrate 420 with a thickness and optical density that may vary (e.g., increases, decreases) as a radius, r, from an origin increases. Further, the second material 425-*b* may be applied to the first material 425-*a*, to the substrate 420, or to both, with a thickness and optical density that also varies (e.g., increases, decreases) as the radius from the origin increases. The thickness of the VDP 415 and the respective materials 425 may be measured using various techniques, such as optical measurements (e.g., spectrophotometry, laser thickness sensing, microscopy) or using other techniques. In some examples, the origin of such measurements may approximately correspond to a location of the light source 405 (e.g., within some tolerance or threshold distance). In such cases, multiple thickness measurements (e.g., from the surface of the substrate 420) may correspond to respective optical densities of the first material 425-*a* and the second material 425-*b*.

The optical density profile 402 shows the optical densities of the materials of the VDP 415. In some examples, the optical density of the materials 425 and the optical density of the VDP 415 may be measured using various techniques, such as spectrophotometry (e.g., UV-visible spectrophotometry) or other methods. The optical density refers to a measurement of absorbance of a material and defined as a ratio of an intensity of light incident on the material and an intensity of the light transmitted. Here, the first material optical density 435 may vary over various radial positions across the VDP 415. Likewise, the second material optical density 440 may vary over various radial positions across the VDP 415. This may result in a total optical density 445 of the VDP 415 that decreases as the radius increases. The relatively higher density of the VDP 415 at or near the origin as compared to radii further from the origin, while also using multiple materials (e.g., at least the first material 425-*a* and the second material 425-*b*), the VDP 415 may have a lower transmittance and a greater reflectance near the light source than away from the light source.

Figure 5A:
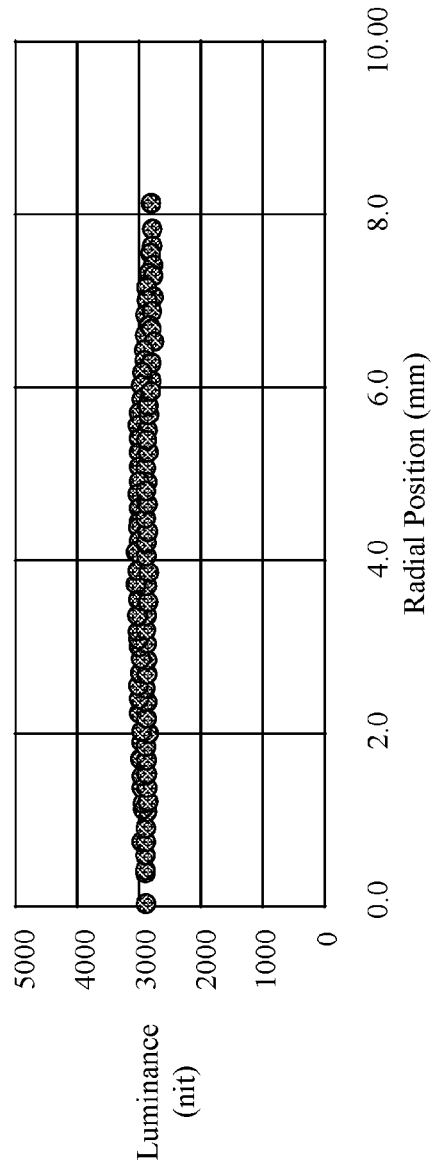
FIGS. 5A and 5B illustrate examples of luminosity and color distributions that support a VDP for improving color and luminosity uniformity in accordance with aspects of the present disclosure.
Figure 5B:
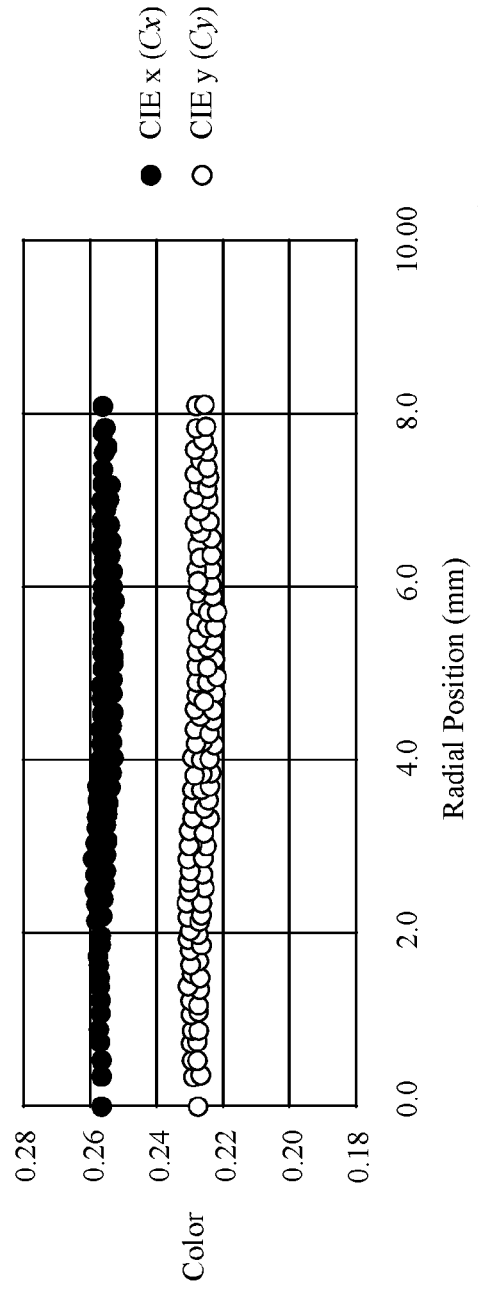

FIGS. 5A and 5B illustrate examples of a luminosity distribution 501 and a color distribution 502, respectively, that support a VDP for improving color and luminosity uniformity in accordance with aspects of the present disclosure.

As described herein, a VDP applied to a substrate may be configured to diffuse light from a light source (e.g., an LED), where the diffused light may have luminance uniformity and color uniformity measured at various distances from the light source. The VDP may include two or more different materials (e.g., two or more nanoparticle inks), where each material may have a unique spectral reflectance and transmittance.

The luminosity distribution 501 illustrates an example of multiple measurements of light that is scattered by the described VDP. For instance, luminance of the scattered light may be measured be over multiple radial positions measured from an origin, where the origin may correspond to a location of a light source. In some examples, the luminance may be measured using an imaging colorimeter or other methods. As illustrated, the luminance measurements of the light scattered by the VDP across multiple locations (e.g., radial positions) may be approximately uniform (e.g., approximately 3000 candela per square meter ($cd/m^2$) or 3000 nit (nt)) at each of the radial positions (e.g., and correspondingly at different distances from the light source). In such cases, the luminance may vary within a threshold value across the radial positions. The VDP described herein may achieve other values of luminosity that are approximately uniform, and the examples provided herein are included for ease of description and should not be considered limiting.

The color distribution 502 may similarly illustrate multiple measurements of light that is scattered by the described VDP. The color (e.g., corresponding to CIE color coordinates) of the scattered light may be measured across the multiple radii from an origin or one or more locations that correspond(s) to the location of the light source. The color may be measured using an imaging colorimeter or using other techniques. In addition, different sets of measurements illustrated by the color distribution 502 may correspond to CIE x (Cx) and CIE y (Cy) values (e.g., in accordance with the CIE 1931 model). In any case, the color measurements of the light scattered by the VDP across multiple locations (e.g., radial positions) may be approximately uniform. As an example, the CIE x color coordinate may be between about 0.22 and about 0.23 at each of the radial positions, whereas the CIE y color coordinate may be between about 0.25 and about 0.26 at each of the radial positions. As such, the color at different radii may vary within a threshold value. The VDP described herein may achieve other CIE colors that are approximately uniform, and the examples provided herein are included for ease of description and should not be considered limiting.

Figure 6A:
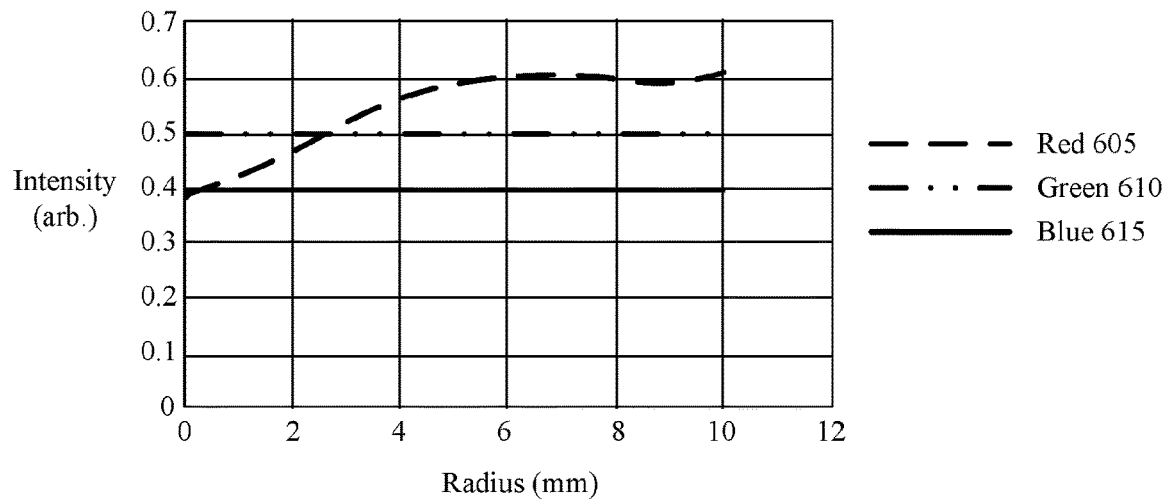
FIGS. 6A, 6B, and 6C illustrate color intensities that support a VDP for improving color and luminosity uniformity in accordance with aspects of the present disclosure.
Figure 6B:
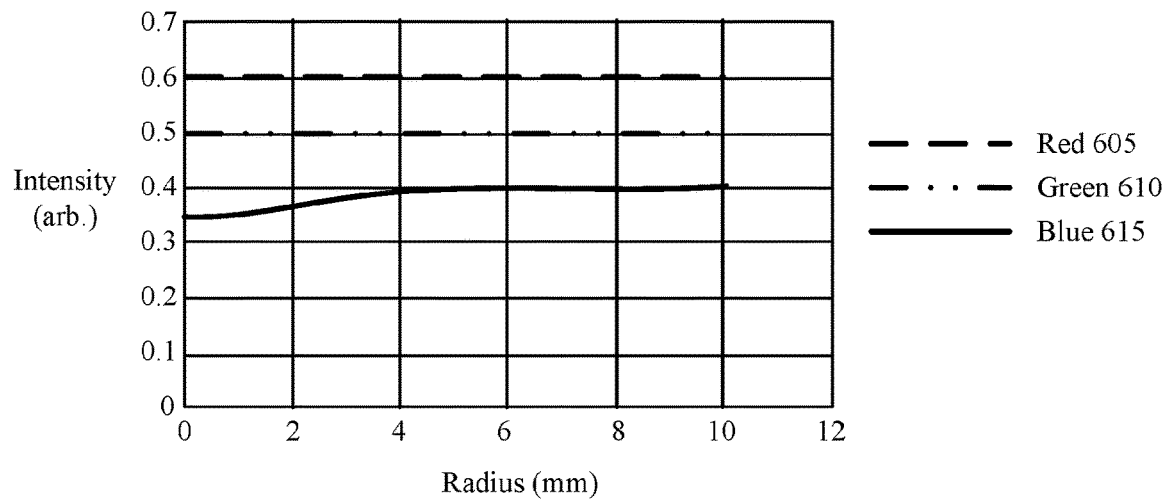
Figure 6C:
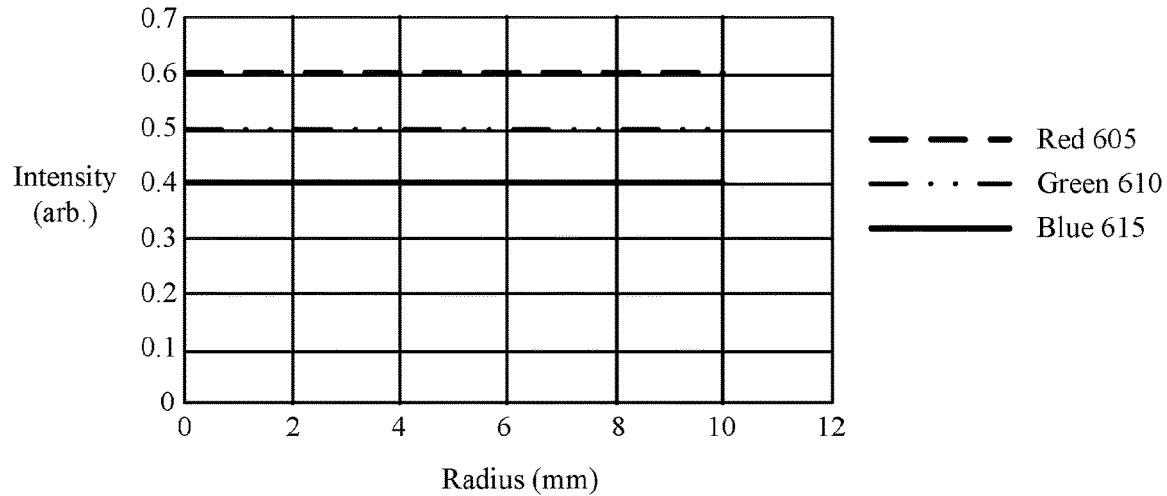

FIGS. 6A, 6B, and 6C illustrate intensities of respective wavelengths of light that support a VDP for improving color and luminosity uniformity in accordance with aspects of the present disclosure. More specifically, FIGS. 6A, 6B, and 6B show intensities of light having a wavelength of about 650 nm (red light), light having a wavelength of about 550 nm (green light), and light having a wavelengths of about 450 nm (blue light) associated with techniques for modifying the materials of a VDP to achieve color uniformity for light scattered by the VDP. Similarly, the FIGS. 6A, 6B, and 6B show tristimulus values X (red), Y (green), and Z (blue) for light scattered by a VDP described herein. In such cases, the materials used may include two or more color conversion materials, such as quantum dots, or phosphors, or other color conversion materials. The color conversion materials may be an example of ink that may be used to eliminate color mura (e.g., irregular color distributions). Quantum dots may be an example of efficient color converters that absorb light (e.g., blue LED light) and convert the light (e.g., convert a wavelength of the light) to another color (e.g., to light having a wavelength corresponding to red light or a wavelength corresponding to green light).

FIG. 6A illustrates light intensities as a function of different radial positions from an origin (e.g., a point that corresponds to a location of a light source, within some tolerance or threshold) and based on measurements of the light scattered by a VDP. In such cases, an intensity of red light 605 (e.g., having a wavelength between about 620 nm and about 700 nm), green light 610 (e.g., having a wavelength between about 520 nm and 570 nm), and blue light 615 (e.g., having a wavelength between about 380 nm and about 500 nm) may be measured across multiple radii. As shown by FIG. 6A, some area of a VDP may be deficient in a particular color (e.g., corresponding to CIE chromaticity coordinates) compared to the average of the light scattered by the VDP. For example, multiple inks of the VDP may enable approximate uniformity for the green light 610 and blue light 615, but some areas (e.g., at locations closer to the light source than location further from the light source) may be deficient in the red light 605 (e.g., decreased intensity of red light 605 compared to the green light 610 and the blue light 615). Using selective printing (e.g., onto a substrate) of a red quantum dot ink that converts the blue light 615 to red light 605, the red deficiency may be eliminated (e.g., compensated for) within that area.

In FIG. 6B, the illustrated light intensities as a function of the different radial positions from the origin are based on measurements taken after the red quantum dot ink was applied. FIG. 6B indicates that additional absorption of the blue light 615 by the added red quantum dots may result in a blue deficiency (e.g., in or near the area of the VDP where the red quantum dot ink was printed). In some examples, the blue light 615 deficiency may be eliminated by reducing the thickness of the scattering ink that attenuated the blue light 615 from the light source.

FIG. 6C illustrates the light intensities as a function of the different radial positions from the origin based on measurements taken after the thickness of the scattering ink that attenuated the blue light 615 was reduced, resulting in approximately uniform intensities for the red light 605, the green light 610, and the blue light 615 for light that has been scattered by the VDP. That is, the radial intensity of the blue light 615 may be rebalanced by reducing an attenuation of one or more scattering inks.

Figure 7:
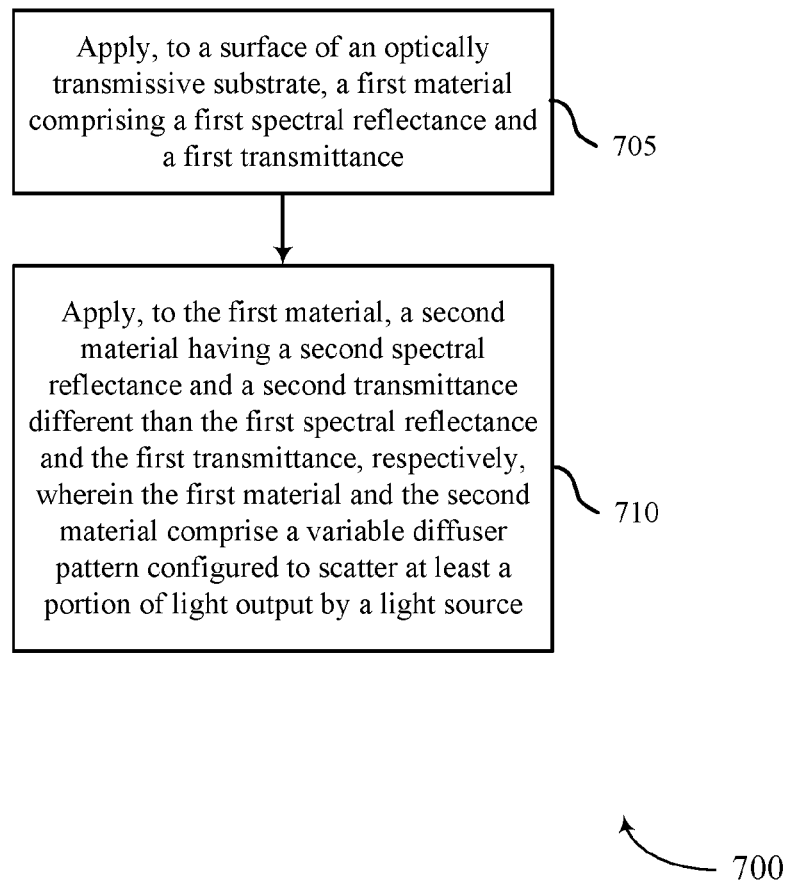
FIG. 7 shows a flow chart that supports a VDP for improving color and luminosity uniformity in accordance with aspects of the present disclosure.

FIG. 7 shows a flowchart illustrating a method 700 that supports a VDP for improving color and luminosity uniformity in accordance with aspects of the present disclosure. The operations of the method 700 may be implemented by a device or its components as described herein. For example, the operations of the method 700 may be performed by a device configured for one or more printing processes (e.g., ink-jet printing processes, screen-printing processes). In some examples, the device may execute a set of instructions to control the functional elements of the device to perform the described functions. Additionally or alternatively, the device may perform aspects of the described functions using special-purpose hardware.

At 705, the method may include applying, to a surface of an optically transmissive substrate, a first material comprising a first spectral reflectance and a first transmittance. The operations of 705 may be performed in accordance with examples as disclosed herein.

At 710, the method may include applying, to the first material, a second material having a second spectral reflectance and a second transmittance different than the first spectral reflectance and the first transmittance, respectively, where the first material and the second material include a variable diffuser pattern configured to scatter at least a portion of light output by a light source. The operations of 710 may be performed in accordance with examples as disclosed herein.

In some examples, an apparatus as described herein may perform a method or methods, such as the method 700. The apparatus may include, features, circuitry, logic, means, or instructions (e.g., a non-transitory computer-readable medium storing instructions executable by a processor) for applying, to a surface of an optically transmissive substrate, a first material having a first spectral reflectance and transmittance, and applying, to the first material, a second material having a second spectral reflectance and transmittance different than the first spectral reflectance and transmittance, where the first material and the second material include a variable diffuser pattern configured to scatter at least a portion of light output by a light source.

In some examples of the method 700 and the apparatus described herein, the first material and the second material are applied in accordance with a ratio of the first material and the second material that produces scattered light output by the light source having approximately uniform luminance and CIE color coordinates.

In some examples of the method 700 and the apparatus described herein, the apparatus may include operations, features, circuitry, logic, means, or instructions for applying the second material to the surface of the optically transmissive substrate to create a composite of the first material and the second material.

In some examples of the method 700 and the apparatus described herein, the first material and the second material may be applied in accordance with a first optical density profile of the first material and a second optical density profile of the second material that produce scattered light output by the light source having approximately uniform luminance and CIE color coordinates. In some examples of the method 700 and the apparatus described herein, the first material and the second material are applied using at least one of an ink-jet printing process or a screen printing process.

An apparatus is described. The apparatus may include an optically transmissive substrate and a VDP applied to a surface of the optically transmissive substrate and configured to scatter a portion of light output by a light source. In some cases, the variable diffuser pattern includes a first material and a second material different than the first material. The first material may have a first spectral reflectance and a first transmittance, and the second material may have a second spectral reflectance different than the first spectral reflectance and a second transmittance different than the first transmittance.

In some examples of the apparatus, first respective values of the first transmittance and the second transmittance at a first distance from the light source are less than second respective values of the first transmittance and the second transmittance at a second distance from the light source greater than the first distance. In some examples of the apparatus, first respective values of the first spectral reflectance and the second spectral reflectance at the first distance are greater than second respective values of the first spectral reflectance and the second spectral reflectance at the second distance.

In some examples of the apparatus, the first material includes a first ink that scatters a greater quantity of the light output by the light source in a blue light wavelength relative to a red light wavelength and a green light wavelength, and the second material includes a second ink that scatters a greater quantity of the light output by the light source in the red light wavelength relative to the blue light wavelength and the green light wavelength.

In some examples of the apparatus, the blue light wavelength comprises a wavelength between about 400 nm and about 500 nm, the red light wavelength comprises a wavelength between about 620 nm and about 700 nm, and the green light wavelength comprises a wavelength between about 520 nm and about 570 nm.

In some examples of the apparatus, the first material includes an ink having a first plurality of nanoparticles with a first average size, and the second material includes the ink having a second plurality of nanoparticles with a second average size different than the first average size. In some examples of the apparatus, the first average size corresponds to a first particle radius that is between about 50 nanometers and about 400 nanometers, and the second average size corresponds to a second particle radius that is between about 50 nanometers and about 400 nanometers and is greater than the first particle radius.

In some examples of the apparatus, the first material includes a first color conversion material configured to convert the light output by the light source from a first wavelength to a second wavelength different than the first wavelength and the second material includes a second color conversion material configured to convert the light output by the light source from the first wavelength to a third wavelength different than the first wavelength and the second wavelength.

In some examples of the apparatus, one or both of the first material or the second material absorbs a second portion of the light output by the light source different than the portion of the light that is scattered.

In some examples of the apparatus, the first material comprises a first thickness profile measured from the surface of the optically transmissive substrate on which the first material is disposed and the second material has a second thickness profile different than the first thickness profile and measured from the surface of the optically transmissive substrate on which the second material is disposed. In some examples, the first thickness profile includes a first set of thicknesses over a plurality of distances across the optically transmissive substrate and the second thickness profile includes a second set of thicknesses over the plurality of distances across the optically transmissive substrate, where the second set of thicknesses is different than the first set of thicknesses.

In some examples of the apparatus, the portion of the light output by the light source and scattered by the variable diffuser pattern has an approximately uniform luminance over a plurality of distances from the light source. In some examples of the apparatus, the portion of the light output by the light source and scattered by the variable diffuser pattern has an approximately uniform color over the plurality of distances from the light source.

In some examples of the apparatus, the first material includes a first plurality of nanoparticles that are each between about 150 nm and about 250 nm in diameter and the first spectral reflectance and transmittance is associated with scattering a greater quantity of light having a wavelength corresponding to blue light with respect to light having a wavelength corresponding to red light and light having a wavelength corresponding to green light. In some examples of the apparatus, the second material includes a second plurality of nanoparticles that are each between about 250 nm and 350 nm in diameter and the second spectral reflectance and transmittance is associated with scattering a greater quantity the light having a wavelength corresponding to red light with respect to the light having the wavelength corresponding to blue light and the light having the wavelength corresponding to green light.

In some examples of the apparatus, the light source includes an LED configured to generate blue light. In some examples of the apparatus, the optically transmissive substrate includes a glass material or a plastic material.

An apparatus is described. The apparatus may include a light source, an optically transmissive substrate, and a variable diffuser pattern applied to a surface of the optically transmissive substrate and configured to diffuse light from the light source. In some examples, the variable diffuser pattern may include one or more layers of a first nanoparticle material and a second nanoparticle material different than the first nanoparticle material, where the first nanoparticle material may include a first white ink having a first reflective scattering power associated with scattering greater quantities of light in a blue light wavelength relative to light in a red light wavelength and light in a green light wavelength. In some examples, the second nanoparticle material may include a second white ink having a second reflective scattering power associated with scattering greater quantities of light in the red light wavelength relative to the light in the blue light wavelength and the light in the green light wavelength.

In some examples of the apparatus, the first nanoparticle material includes a first plurality of nanoparticles that are about 200 nanometers in diameter and associated with diffusing a first portion of the light at a wavelength of about 450 nanometers, and where the second nanoparticle material includes a second plurality of nanoparticles that are about 300 nanometers in diameter and associated with diffusing a second portion of the light at a wavelength of about 650 nanometers.

In some examples of the apparatus, one or both of the first nanoparticle material or the second nanoparticle material includes titanium dioxide, silicone dioxide, aluminum oxide, polymethyl methacrylate, or combinations thereof.

In some examples of the apparatus, a luminance and CIE color coordinates of the light diffused by the first nanoparticle material and the second nanoparticle material are approximately uniform at a plurality of radial positions from the light source.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the term "about" means that the modified characteristic (e.g., a verb or adjective modified by the term substantially) or a related aspect (e.g., related action or function), need not be absolute but is close enough to achieve the advantages of the characteristic or related aspect (e.g., related action or function).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein may be implemented or performed with a general-purpose processor, a digital signal processor (DSP), a central processing unit (CPU), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise random-access memory (RAM), read-only memory (ROM), electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus comprising:
  a substrate; and
  a variable diffuser pattern applied to a surface of the substrate and configured to scatter a portion of light output by a light source, the variable diffuser pattern comprising a first material and a second material different than the first material, the first material comprising a first spectral reflectance and a first transmittance, and the second material comprising a second spectral reflectance different than the first spectral reflectance and a second transmittance different than the first transmittance,
  wherein the first material comprises a first ink that scatters a greater quantity of the light output by the light source in a blue light wavelength relative to a red light wavelength and a green light wavelength, and the second material comprises a second ink that scatters a greater quantity of the light output by the light source in the red light wavelength relative to the blue light wavelength and the green light wavelength.

2. The apparatus of claim 1, wherein:
  first respective values of the first transmittance and the second transmittance at a first distance from the light source are less than second respective values of the first transmittance and the second transmittance at a second distance from the light source greater than the first distance; and
  first respective values of the first spectral reflectance and the second spectral reflectance at the first distance are greater than second respective values of the first spectral reflectance and the second spectral reflectance at the second distance.

3. The apparatus of claim 1, wherein the blue light wavelength comprises a wavelength between about 400 nanometers and about 500 nanometers, the red light wavelength comprises a wavelength between about 620 nanometers and about 700 nanometers, and the green light wavelength comprises a wavelength between about 520 nanometers and about 570 nanometers.

4. The apparatus of claim 1, wherein the first material comprises an ink comprising a first plurality of nanoparticles with a first average size, and the second material comprises the ink comprising a second plurality of nanoparticles with a second average size different than the first average size, the first average size corresponding to a first particle radius that is between about 50 nanometers and about 400 nanometers, and the second average size corresponding to a second particle radius that is between about 50 nanometers and about 400 nanometers and is greater than the first particle radius.

5. The apparatus of claim 1, wherein the first material comprises a first color conversion material configured to convert the light output by the light source from a first wavelength to a second wavelength different than the first wavelength and the second material comprises a second color conversion material configured to convert the light output by the light source from the first wavelength to a third wavelength different than the first wavelength and the second wavelength.

6. The apparatus of claim 1, wherein one or both of the first material or the second material absorbs a second portion of the light output by the light source different than the portion of the light output by the light source that is scattered.

7. The apparatus of claim 1, wherein the first material comprises a first thickness profile measured from the surface of the substrate and the second material comprises a second thickness profile different than the first thickness profile and measured from the surface of the substrate, the first thickness profile comprising a first set of thicknesses over a plurality of distances across the substrate and the second thickness profile comprising a second set of thicknesses different than the first set of thicknesses over the plurality of distances across the substrate.

8. The apparatus of claim 1, wherein:
the portion of the light output by the light source and scattered by the variable diffuser pattern has an approximately uniform luminance over a plurality of distances from the light source; and
the portion of the light output by the light source and scattered by the variable diffuser pattern has approximately uniform Commission Internationale de l'Elcairage (CIE) color coordinates over the plurality of distances from the light source.

9. The apparatus of claim 1, wherein:
the first material comprises a first plurality of nanoparticles that are each between about 150 nanometers and about 250 nanometers in diameter and the first spectral reflectance and transmittance is associated with scattering a greater quantity of light having a wavelength corresponding to blue light with respect to light having a wavelength corresponding to red light and light having a wavelength corresponding to green light; and
the second material comprises a second plurality of nanoparticles that are each between about 250 nanometers and about 350 nanometers in diameter and the second spectral reflectance and transmittance is associated with scattering a greater quantity of the light having the wavelength corresponding to red light with respect to the light having the wavelength corresponding to the blue light and the light having the wavelength corresponding to the green light.

10. The apparatus of claim 1, wherein the light source comprises a light emitting diode configured to generate blue light, and the substrate comprises a glass material or a plastic material.

11. A method comprising:
applying a first material comprising a first spectral reflectance and a first transmittance to a surface of a substrate; and
applying to the first material a second material having a second spectral reflectance and a second transmittance different than the first spectral reflectance and the first transmittance, respectively, wherein the first material and the second material comprise a variable diffuser pattern configured to scatter at least a portion of light output by a light source,
wherein the first material comprises a first ink that scatters a greater quantity of the light output by the light source in a blue light wavelength relative to a red light wavelength and a green light wavelength, and the second material comprises a second ink that scatters a greater quantity of the light output by the light source in the red light wavelength relative to the blue light wavelength and the green light wavelength.

12. The method of claim 11, wherein the first material and the second material are applied in accordance with a ratio of the first material and the second material that produces scattered light output by the light source having approximately uniform luminance and Commission Internationale de l'Elcairage (CIE) color coordinates.

13. The method of claim 11, further comprising applying the second material to the surface of the substrate to create a composite of the first material and the second material.

14. The method of claim 11, wherein the first material and the second material are applied in accordance with a first optical density profile of the first material and a second optical density profile of the second material that produce scattered light output by the light source having an approximately uniform luminance and Commission Internationale de l'Elcairage (CIE) color coordinates.

15. The method of claim 11, wherein the first material and the second material are applied using at least one of an ink-jet printing process or a screen-printing process.

16. An apparatus comprising:
a light source;
a substrate; and
a variable diffuser pattern applied to a surface of the substrate and configured to diffuse light from the light source, the variable diffuser pattern comprising one or more layers of a first nanoparticle material and a second nanoparticle material different than the first nanoparticle material, the first nanoparticle material comprising a first white ink having a first reflective scattering power associated with scattering greater quantities of light in a blue light wavelength relative to light in a red light wavelength and light in a green light wavelength, and the second nanoparticle material comprising a second white ink having a second reflective scattering power associated with scattering greater quantities of light in the red light wavelength relative to the light in the blue light wavelength and the light in the green light wavelength.

17. The apparatus of claim 16, wherein the first nanoparticle material comprises a first plurality of nanoparticles that are about 200 nanometers in diameter and associated with diffusing a first portion of the light at a wavelength of about 450 nanometers, and wherein the second nanoparticle material comprises a second plurality of nanoparticles that are about 300 nanometers in diameter and associated with diffusing a second portion of the light at a wavelength of about 650 nanometers.

18. The apparatus of claim 16, wherein one or both of the first nanoparticle material or the second nanoparticle material comprises titanium dioxide, silicone dioxide, aluminum oxide, polymethyl methacrylate, or combinations thereof.

19. The apparatus of claim 16, wherein a luminance and Commission Internationale de l'Elcairage (CIE) color coordinates of the light diffused by the first nanoparticle material and the second nanoparticle material are approximately uniform at a plurality of radial positions from the light source.

* * * * *